(12) United States Patent
Englert

(10) Patent No.: US 6,292,223 B1
(45) Date of Patent: Sep. 18, 2001

(54) RECEIVING DEVICE FOR RECEIVING VIDEO AND TELETEXT SIGNALS

(75) Inventor: Ulrich Englert, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/694,561

(22) Filed: Oct. 23, 2000

Related U.S. Application Data

(63) Continuation of application No. PCT/DE99/00840, filed on Mar. 22, 1999.

(30) Foreign Application Priority Data

Apr. 22, 1998 (DE) .............................. 198 18 048

(51) Int. Cl.[7] .................................................. H04N 7/087
(52) U.S. Cl. ........................ 348/468; 348/461; 348/465; 348/473; 348/478; 348/705
(58) Field of Search .................. 348/468, 461, 348/465, 473, 478, 477, 705, 706, 554, 563, 476; H04N 7/08, 7/087

(56) References Cited

U.S. PATENT DOCUMENTS

| | | | |
|---|---|---|---|
| 4,954,882 * | 9/1990 | Kamemoto ......................... 358/22 |
| 5,023,721 * | 6/1991 | Moon-Hwan ....................... 358/147 |
| 5,327,174 * | 7/1994 | Kim .................................. 348/468 |
| 5,900,913 * | 5/1999 | Tults ................................. 348/468 |
| 5,978,036 * | 11/1999 | Higa et al. ......................... 348/468 |
| 6,011,594 * | 1/2000 | Takashima ......................... 348/565 |
| 6,091,456 * | 7/2000 | Schaas .............................. 348/460 |

FOREIGN PATENT DOCUMENTS 0 512 130 A1    11/1992    (EP) .

OTHER PUBLICATIONS

Published International Application No. WO 93/11632 (Gleim et al.), dated Jun. 10, 1993.

* cited by examiner

*Primary Examiner*—Reinhard J. Eisenzopf
*Assistant Examiner*—Jean W. Désir
(74) *Attorney, Agent, or Firm*—Herbert L. Lerner; Laurence A. Greenberg; Werner H. Stemer

(57) ABSTRACT

The analog-to-digital converter device (24) provided for processing teletext signals is used for two purposes. In time slots in which no sync signal or teletext signal is separated from the video input signal (CVBS), the analog-to-digital converter device (24) is used for other tasks, e.g. for interrogating keypad inputs of an operator control unit (30).

12 Claims, 2 Drawing Sheets

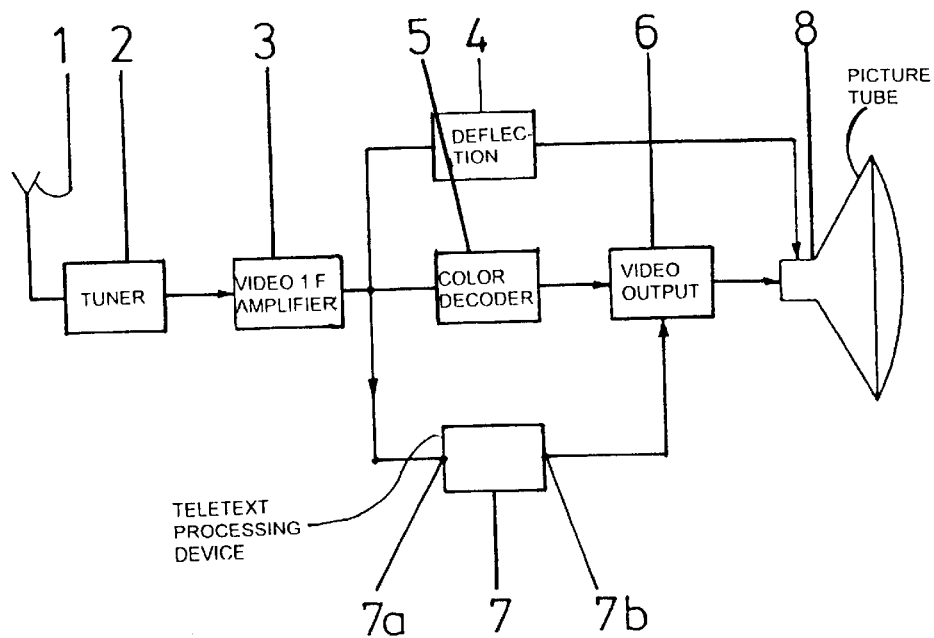
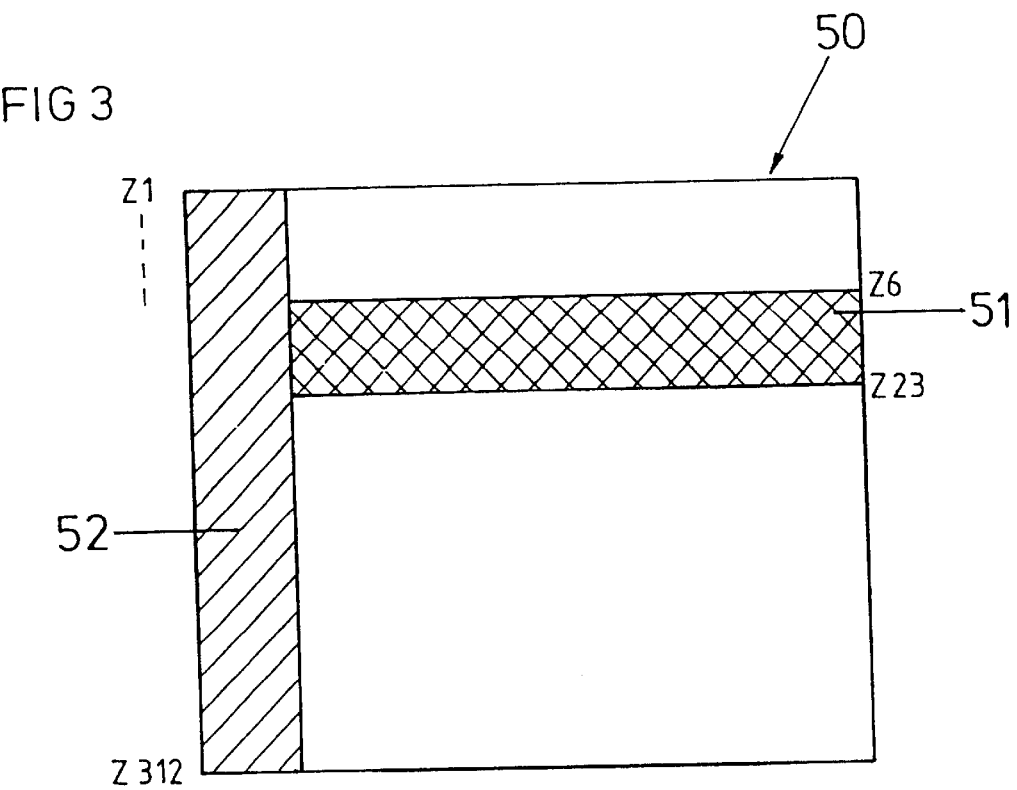

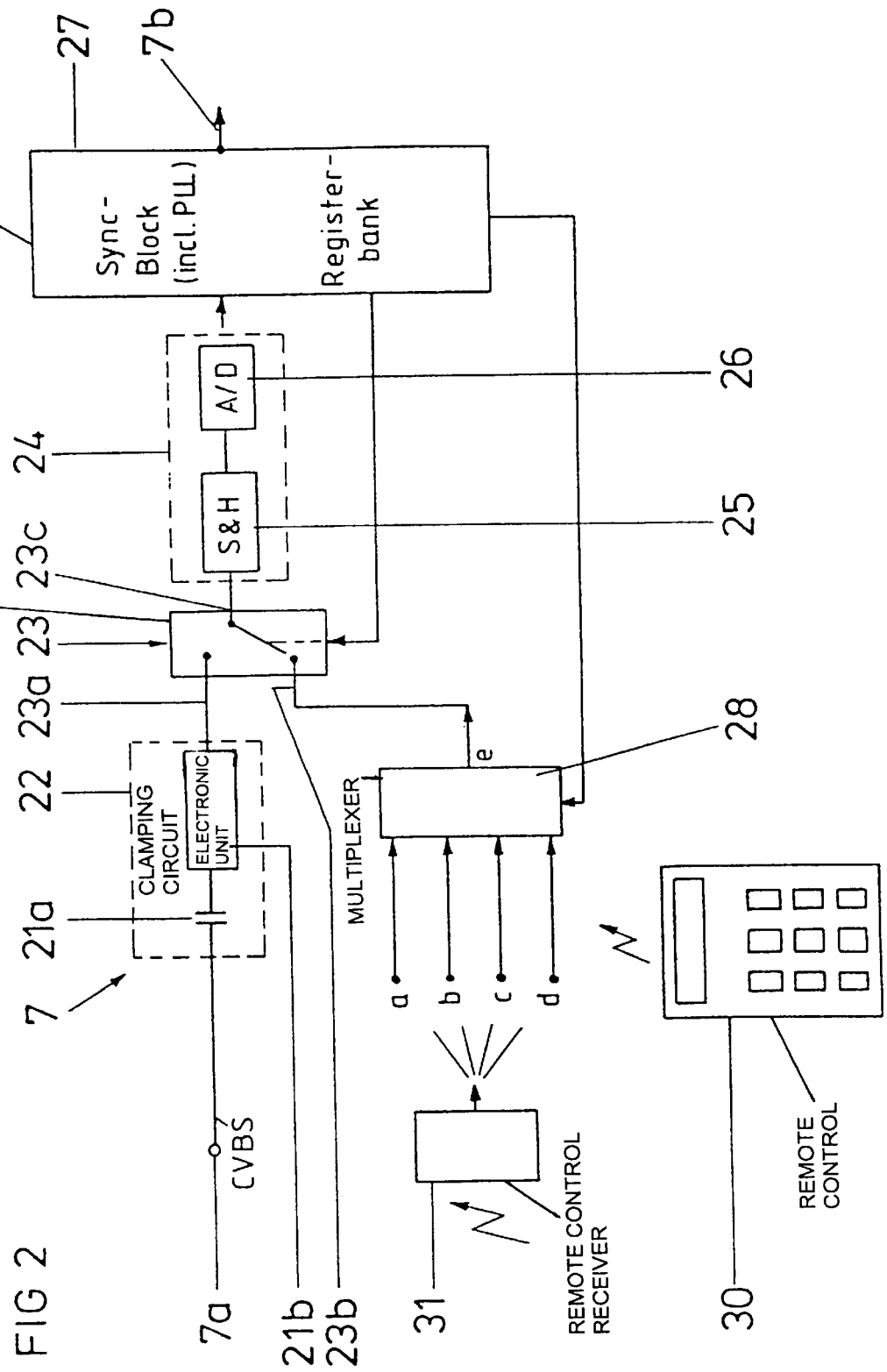

RECEIVING DEVICE FOR RECEIVING VIDEO AND TELETEXT SIGNALS

CROSS-REFERENCE TO RELATED APPLICATION

This is a continuation of copending international application PCT/DE99/00840, filed Mar. 22, 1999, which designated the United States.

BACKGROUND OF THE INVENTION

Field of the Invention

The invention relates to a receiving device for receiving video and teletext signals.

Such receiving devices are in the mean time commercially available television sets and video recorders in which teletext decoders are integrated. More and more broadcasting corporations are going over to transmitting not only television broadcasts but also additional information for the viewer in the form of teletext pages. In the case of World System Teletext, called teletext for short, the teletext data for the teletext pages to be displayed on the screen can be transmitted in the television lines 6 to 23 and 318 to 353 of the vertical blanking interval of the video signal, assuming a 625 line television system. The teletext data are transmitted continually in a specially encoded format at a bit rate of 6.9375 MHz and 360 bits per teletext line. Each teletext character that is transmitted requires a byte having 7 data bits and one parity bit. In Level 1 of World System Teletext, a teletext page consists of 24 teletext lines which each begin with teletext address data with subsequent teletext data.

The first teletext line of a teletext page has, as teletext address data, a magazine number with subsequent line number, page number, page sub-number and check bits, adjoined by 32 bytes of teletext data. By contrast, the teletext lines 1 to 23 are provided only with the magazine and line numbers as teletext addresses. The page numbers may lie between 100 and 899, the first digit identifying the eight magazines present in the teletext system.

If consecutive information requires more than one teletext page, subpages can be communicated. These subpages are likewise identified in the first teletext line of the teletext page.

The teletext pages transmitted by the broadcasting corporations are transmitted cyclically, that is to say that after all the pages contained in the editorial office of the broadcasting corporation have been transmitted, a cycle is ended. The same pages are retransmitted in the next cycle. In order that the cycle time and, consequently, the waiting time at the receiving end for the user of the teletext service remain reasonable, the number of teletext pages contained in a cycle is limited. The cycle time is about 20 seconds. The number of pages per cycle thus results from the cycle time and the number of teletext data lines used per vertical blanking interval.

In principle, the teletext data are concomitantly transmitted together with the video signal data in the abovementioned time frame, which means that the teletext data are transmitted in specific lines which are indiscernible on the screen. In this case, the teletext data are present at the receiver input in analog form, just like the video signals. In order to be able to decode the teletext data, the latter are regularly separated from the video input signal by a suitable circuit configuration. This is done by a so-called data slicer. In this case, the video input signal, generally the CVBS signal, is clamped by means of a capacitor and sampled by means of a sample & hold circuit, and then digitized in an analog/digital converter. The now digitized teletext signal is fed to a control device or a control block for further processing. A sync information item can be recovered from the digitized data. This sync information is used to establish exactly the time slots for which the teletext data to be decoded are transmitted.

Furthermore, in such receiving devices, a multiplicity of analog signals have to be digitized so that they can be processed further in a microcontroller of the receiving device. One example of such analog signals is the keypad interrogation of a remote control. In that case, by actuating keys, an operator alters for example the volume or the brightness of the picture to be displayed on a screen. This signal is initially present at the remote control receiver in the form of a modulated analog signal, which must be digitized for further processing in the microcontroller.

SUMMARY OF THE INVENTION

It is accordingly an object of the invention to provide a receiving device which overcomes the above-mentioned disadvantageous of the prior art devices of this general type in which the design of the receiving device is simplified in comparison with conventional receiving devices and is thus less expensive to produce.

With the foregoing and other objects in view there is provided, in accordance with the invention a receiving device that has a teletext processing device for decoding and providing the decoded teletext signals. The teletext processing device has, on the input side, a clamping circuit with an analog/digital converter device connected downstream, and also a control device for the correctly timed separation of the teletext signals from the video input signal. A switching device is connected upstream of the analog/digital converter device, to which switching device the video input signal which has been passed through the clamping circuit can be fed as a first analog signal to a first input terminal thereof and a second analog signal can be fed at a second input terminal thereof. The switching device can be controlled by the control device in such a way that in time slots in which no teletext signals can be separated from the video input signal, the second analog signal can be fed to the analog/digital converter device.

The principle underlying the invention thus resides in the fact that the analog/digital converter device provided for processing the teletext signals is used for two purposes. In time slots in which no teletext signal, or no signals which are necessary for teletext processing, are separated from the video input signal, the analog/digital converter device is used for other tasks, thus, for example, for interrogation of keypad inputs of an operator control unit.

In accordance with an added feature of the invention, the second analog signal can be tapped off at the output of a further switching device, also called a multiplexer, in which case a plurality of analog signals can be fed to the further switching device on the input side. This further switching device is likewise driven by the control device already mentioned. This development has the advantage that different analog signals can optionally be fed, for digital conversion, to the analog/digital converter device present in the teletext processing device. By way of example, the setting of the brightness, volume, contrast, or the like of a remote control of the receiving device may be provided as the keypad interrogation signal. The second analog signal may also be an AFC signal (Automatic Frequency Control signal).

In accordance with an additional feature of the invention, the video input signal is a television signal, in which case the control device of the teletext processing device connects the switch of the switching device to the first input terminal of the switching device at least for the time slots which are necessary for sync signal separation, and during the reception of the time slots provided for teletext signal transmission. The time slots are currently chosen such that they occur during the reception of the video input signal intended for the video lines 6 to 23 and/or 318 to 353. In these time slots, the switch of the switching device is connected to the first input terminal, with the result that the teletext signals to be processed actually pass to the analog/digital converter device. In the remaining time slots, the switch of the switching device is coupled to the second input, with the result that the analog/digital converter device of the teletext processing device is available for the digital conversion of other analog signals.

In accordance with another feature of the invention, the control device has a detection device which detects whether a teletext signal is present at the input terminal of the teletext processing device. The switch of the switching device is continuously connected to the second input terminal in the absence of a teletext signal. The detection device may have a PLL circuit.

In accordance with a concomitant feature of the invention, the entire circuit configuration is preferably realized in integrated form as an integrated circuit.

The following may be emphasized. Microcontrollers for operating functions or remote control functions in receiving devices usually contain analog/digital converters for general control functions, such as e.g. keypad interrogation, AFC control, etc. The requirements made of such converters in terms of frequency are relatively relaxed, that is to say that it is not necessary to choose a very high processing speed. Furthermore, receiving devices with a teletext decoder have an integrated data slicer with a video analog-to-digital converter. The idea behind the present invention therefore consisted in saving one of these required analog/digital converters.

Other features which are considered as characteristic for the invention are set forth in the appended claims.

Although the invention is illustrated and described herein as embodied in a receiving device for receiving video and teletext signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a block diagram of the television set for receiving teletext signals with a teletext processing device;

FIG. 2 shows a block diagram of the teletext processing device shown in FIG. 1, and FIG. 3 diagrammatically shows a field in which the time slots reserved for teletext transmission and sync signal transmission are marked by hatching.

DESCRIPTION OF THE PREFERRED EMBODIMENTS

In the figures below, unless indicated otherwise, identical reference symbols designate identical parts with the same meaning. Referring now to the figures of the drawing in detail and first, particularly, to FIG. 1 thereof, there is shown a block diagram of a television set which is suitable for displaying television pictures and teletext information. On the input side, the receiving device has a tuner 2, which receives the RF input signal from an antenna 1, for example. Connected downstream of the tuner 2 is a video IF amplifier or stage 3, whose output signal is fed both to a horizontal and vertical deflection stage 4 and to a color decoder 5 with a video output stage 6 connected downstream. A picture tube 8 is driven by the horizontal and vertical deflection stage 4 and the video output stage 6. A control device which is present in the receiving device is not illustrated in FIG. 1, in order to provide better clarity.

For receiving and decoding the teletext signals, which are transmitted in the vertical blanking intervals of the video signal, the output of the video IF stage 3 is connected to a teletext processing device 7. The teletext processing device 7 is designed as an integrated circuit and is usually referred to as a teletext decoder. Such a teletext decoder detects the teletext signals in the video signal and, with a so-called data slicer, separates the data stream of the teletext signals from the rest of the video signal (color burst, sync signals, etc.). Furthermore, the teletext processing device 7 generates a data clock signal which is synchronized with the data clock signal of the teletext signal. The actual data processing of the teletext signals is subsequently effected in the teletext processing device 7. The teletext data determined in the course of the data processing of the teletext signals are stored in a storage device and the content thereof is fed via a character generator to the video output stage 6 of the receiving device. By this means, a teletext page can be inserted as required on the television picture tube 8 of the receiving device.

FIG. 2 schematically illustrates the circuit configuration of the teletext processing device 7 of FIG. 1 in more detail. The reference symbol 7a designates the input terminal of the teletext processing device 7, and 7b the output terminal thereof.

The input terminal 7a is connected to the input of a clamping circuit 22. The clamping circuit 22 essentially comprises a capacitor 21a with an electronic unit 21b connected downstream. The clamping circuit 22 serves for referring to the video input signal present at the input terminal 7a to a prescribed reference potential, in order to ensure entirely satisfactory further processing of this video input signal. Clamping circuits 22 of this type are known per se. The output of the clamping circuit 22 is connected to a first input terminal 23a of a switching device 23. The switching device 23, also called multiplexer, has a second input terminal 23b and an internal switch, which optionally connects an output terminal 23c of the switching device 23 to one of the two input terminals 23a, 23b.

The output 23c of the switching device 23 is in contact with a control device 27 via an analog/digital converter device 24. In the present exemplary embodiment, the analog/digital converter device 24 has, on the input side, a sample & hold circuit 25 with an analog/digital converter 26 connected downstream.

The output of the analog/digital converter device 24 is connected to a control device 27. This control device 27 contains a synchronization block that includes a PLL circuit. This synchronization block serves for detecting the teletext signals in the video input signal and separating the data stream of the teletext signals from the rest of the video input signal. Furthermore, the synchronization block in the control device 27 serves for generating a data clock signal which is synchronized with the data clock signal of the teletext signal. At the same time, the actual data processing of the teletext signals is effected in the control device 27. The teletext data determined in the course of the data processing of the teletext signal are stored in a storage device and the contents thereof are made available via a character generator to the output terminal 7b of the teletext processing device.

The control device 27 controls the switch position of the multiplexer or switching device 23 in a manner dependent on the teletext signals that have arrived. Whenever there are no teletext signals to be processed, the switch of the switching device 23 is put into the position illustrated in FIG. 2, with the result that the second input terminal 23b is connected to the analog/digital converter device 24. Further analog signals can thus be applied to the second input terminal 23b of the switching device 23.

In the exemplary embodiment of FIG. 2, the output terminal of a further switching device 28 is connected to the input terminal 23b. An analog signal e, which can be selected from four different analog input signals a, b, c and d in the present exemplary embodiment, is present at the output terminal of the further switching device 28. The analog signals a, b, c or d may originate from a remote control receiver 31, which, via a remote control 30, receives keypad interrogation signals serving e.g. for regulating the brightness, volume, contrast, or the like.

The method of operation of the circuit configuration illustrated in FIG. 2 is as follows. The video input signal present at the input terminal 7a, which signal may be a CVBS signal, is clamped by means of the clamping circuit 23 and, provided that the switch of the switching device 23 is connected to the first input terminal 23a, is sampled in the sample & hold stage 25. The analog/digital stage 26 converts the analog signal into a digital output signal and feeds the latter to the control device 27 for further processing. From the digitized data, the control device 27 determines the synchronization information and thus the data clock signal. A temporal window in which the teletext data had to be separated from the video input signal CVBS is determined with the aid of the synchronization information, which is evaluated in the synchronization block that includes the PLL circuit. This temporal window is illustrated schematically in FIG. 3 using a field of the video input signal. The field is designated by the reference symbol 50 and has picture lines Z1 to Z312. During the hatched times 51, 52, the control device 27 must ensure that the switch of the switching device 23 is connected to the first input terminal 23a. In the remaining periods of time, the switch may, by contrast, be connected to the second input terminal 23b for the purpose of processing other analog signals.

The singly shaded region in FIG. 3 is designated by the reference symbol 52 and marks the periods of time which are necessary for sync signal separation from the video input signal. The region designated by the reference symbol 51 relates to the video input signal for the picture lines Z6 to Z23. The teletext data are transmitted in these picture lines, which are not displayed on the screen. In the non-hatched time phases, the analog/digital converter device 24 is available for digitizing further analog signals, because the control device 27 keeps the switch of the switching device 23 connected to the second input terminal 23b. These other analog signals are not teletext-specific signals.

Preferably, the PLL circuit present in the control device 27 generates a lock signal which is used to detect whether or not a CVBS signal is present at the input terminal 7a of the teletext processing device. In the case of the absence of the CVBS signal, the control device 27 can ensure that the switch of the switching device 23 is continuously connected to the second input terminal 23b, during the absence.

I claim:

1. A receiving device for receiving video signals and teletext signals comprising:
    a video signal processing device;
    a teletext processing device configured to decode an input teletext signal and to provide the decoded teletext signal for display thereof, said teletext processing device including:
    a clamping circuit having an input for receiving the input teletext signal,
    an analog to digital converter device connected downstream from said clamping circuit,
    a control device for correctly timing separation of the input teletext signal from a video signal, said control device connected downstream from said analog to digital converter device, and
    a switching device having an output connected to said analog to digital converter device, said switching device including a first input to which the input teletext signal can be fed and including a second input to which at least one analog signal that is independent of the video signal and that is independent of the teletext signal can be fed;
    said switching device configured for control by said control device such that, in time slots in which no teletext signal can be separated from the video signal, said switching device will feed the analog signal that is independent of the video signal and that is independent of the teletext signal to said analog to digital converter device.

2. The receiving device according to claim 1, wherein said switching device defines a first switching device and comprising a second switching device having a plurality of inputs for receiving a plurality of analog signals that are independent of the video signal and that are independent of the teletext signal, and said second switching device has an output connected to said second input of said first switching device, said output of said second switching device switchably connectable to said plurality of inputs of said second switching device.

3. The receiving device according to claim 1, wherein the analog signal that is independent of the video signal and that is independent of the teletext signal is a keypad interrogation signal that is received from an input unit.

4. The receiving device according to claim 3, comprising the input unit, wherein the input unit is selected from the group consisting of a wire-free input unit and a wire-based input unit.

5. The receiving device according to claim 3 wherein the keypad interrogation signal is provided for setting a parameter selected from the group consisting of brightness, volume, and contrast.

6. The receiving device according to claim 1, wherein the analog signal that is independent of the video signal and that is independent of the teletext signal is an AFC signal.

7. The receiving device according to claim 1, wherein the video signal is a CVBS signal.

8. The receiving device according to claim 1, wherein the video signal is a television input signal, and said control device is configured to connect said output of said switching device to said first input of said switching device, at least for time slots that are necessary for sync signal separation and during reception of time slots provided for transmission of the teletext signal.

9. The receiving device according to claim 8, wherein said control device is configured to connect said output of said switching device to said first input of said switching device during reception of a portion of the video signal intended for video lines 6 to 23 of a field.

10. The receiving device according to claim 9, wherein said control device is configured to connect said output of said switching device to said second input of said switching device during remaining time slots.

11. The receiving device according to claim 1, wherein said control device includes a detection device configured to detect whether the teletext signal is present at said input of said clamping circuit, and said switching device is configured to continuously connect said output of said switching device to said second input of said switching device in an absence of the teletext signal.

12. The receiving device according to claim 11, wherein said detection device includes a PLL circuit.

* * * * *